United States Patent
Legatski et al.

(10) Patent No.: US 7,108,772 B2
(45) Date of Patent: Sep. 19, 2006

(54) DEVICE AND PROCESS FOR ELECTRODIALYSIS OF ULTRAFILTRATION PREMEATE OF ELECTROCOAT PAINT

(75) Inventors: L. Karl Legatski, Fayetteville, NC (US); Eric M. Legatski, Fayetteville, NC (US)

(73) Assignee: CelTech, Inc., Fayetteville, NC (US)

( * ) Notice: Subject to any disclaimer, the term of this patent is extended or adjusted under 35 U.S.C. 154(b) by 404 days.

(21) Appl. No.: 10/203,988

(22) PCT Filed: Feb. 15, 2001

(86) PCT No.: PCT/US01/04886

§ 371 (c)(1),
(2), (4) Date: Aug. 15, 2002

(87) PCT Pub. No.: WO01/60501

PCT Pub. Date: Aug. 23, 2001

(65) Prior Publication Data

US 2003/0010639 A1 Jan. 16, 2003

Related U.S. Application Data

(60) Provisional application No. 60/182,681, filed on Feb. 15, 2000.

(51) Int. Cl.
*C25D 17/00* (2006.01)
*B01D 61/46* (2006.01)

(52) U.S. Cl. .......................... 204/252; 204/627; 204/640
(58) Field of Classification Search ................ 204/521, 204/541, 544, 627, 640, 252; 205/746
See application file for complete search history.

(56) References Cited

U.S. PATENT DOCUMENTS

| | | | | |
|---|---|---|---|---|
| 4,105,534 A | * | 8/1978 | Beatty, III | 204/630 |
| 4,581,111 A | * | 4/1986 | Christenson et al. | 204/518 |
| 5,827,416 A | * | 10/1998 | Brown et al. | 204/472 |

\* cited by examiner

*Primary Examiner*—Arun S. Phasge
(74) *Attorney, Agent, or Firm*—Olson & Hierl, Ltd.

(57) ABSTRACT

An electrodialysis cell (40) suitable for removal of paint solubilizer from electrocoat paint ultrafilter permeate includes a tubular, non-conductive housing (42), a substantially cylindrical, hollow object electrode (48) in the housing, a substantially cylindrical counter electrode (52) situated within the hollow object electrode, and a tubular ion exchange membrane (50) around the counter electrode but spaced from the counter electrode as well as the object electrode. The counter electrode and the tubular membrane together define an annular electrolyte passageway while the object electrode and the tubular membrane together define an annular ultrafilter permeate passageway. The object electrode-to-counter electrode area ratio is at least about 6.

6 Claims, 3 Drawing Sheets

DEVICE AND PROCESS FOR ELECTRODIALYSIS OF ULTRAFILTRATION PREMEATE OF ELECTROCOAT PAINT

CROSS-REFERENCE TO RELATED APPLICATION

This application is a 371 of PCT/US01/04886, filed Feb. 15, 2001, which claims the benefit of U.S. Provisional Application No. 60/182,681, filed on Feb. 15, 2000.

TECHNICAL FIELD OF THE INVENTION

This invention relates to electrocoating systems and process.

BACKGROUND OF THE INVENTION

In the process known as electrocoating or electrodeposition painting, paint solids (pigment and resin) are maintained in solution or as a colloidal suspension by a counter-ion that functions as the solubilizer. In most cases, the paint solids are positively charged, or cationic, and the solubilizer counter-ion is an anion (called cathodic electrocoat). However, in some systems the paint solids are anodic and the counter-ion solubilizer is the cation (called anodic electrocoat). The design and principles disclosed here can apply to either. The examples and design specifics are therefore expressed in terms of the "object electrode", which is the item or "ware" to be painted or the electrode opposite in polarity to the bulk of the paint pigment and resin, and the "counter electrode", which is the electrode of polarity opposite to the object electrode.

In the conventional cathodic electrocoat painting process, the ware to be painted is the electrode and is physically submerged in a container, or so-called "bath", of the paint solution along with one or more counter electrodes that in this particular instance serve as anodes. An analogous cell and process for anodic electrocoat paint can be made by reversing cathode and anode positions.

An electrical field is applied between the object electrode, and the counter electrode, by means of a DC power supply. Paint solids are thereby attracted to and deposited on the ware. In most electrocoat painting systems, the counter electrode is part of an electrodialysis cell in which the counter electrode is inside an enclosure and at least a portion of this enclosure is provided by an ion-exchange membrane material. Electrolyte is circulated inside the enclosure between the counter electrode and ion-exchange membrane and the solubilizer counter-ion is drawn through the membrane into the electrolyte by the electrical field. Electrolyte is periodically withdrawn from this circulating loop and disposed of. In this manner, the composition of the paint is maintained in chemical balance. If, by contrast, only the paint solids are removed in the process and the solubilizer is allowed to accumulate in the solution, the solubilizer-to-paint solids ratio will increase and the paint will become unstable.

A second item of process equipment that is essential to the electrocoating process, in addition to the above described electrodialysis cells, is the ultrafilter. The ultrafilter performs two important functions. First, it produces ultrafiltrate, or permeate, which is used to wash entrained paint off of the ware after the ware is removed from the paint bath and return this paint to the paint bath. The recovery of this paint is essential to the economics and environmental acceptability of electrocoating. If the excess paint were washed from the ware with a solution that had not been extracted from the paint bath, this solution could not be returned to the bath because the bath must be maintained as a closed system. In addition to paint recovery, the ultrafilter plays a role in maintaining paint bath chemistry in that the ultrafiltrate can also be purged from the system to remove contaminants that might otherwise accumulate in the paint bath.

Ultrafiltration of electrocoat paint and removal of paint solubilizer by electrodialysis are well-known processes in the prior art. Also established in the prior art is the idea of removing the solubilizer by electrodialysis of the ultrafilter permeate rather than via cells placed directly in the paint bath, for example U.S. Pat. No. 4,581,111 and U.S. Pat. No. 3,663,405 both to Christenson et al. However, this "external electrodialysis" system has never been commercially successful.

Removal of the solubilizer by electrodialysis of permeate instead of direct electrodialysis in the paint bath is commercially attractive, however, for several reasons:

1. Electrodialysis cells must be periodically inspected, maintained, and occasionally replaced. This is difficult to accomplish with in situ cells because the paint bath is typically inside an enclosure for safety reasons. The paint is also unpleasant to work with because it contains hazardous chemicals and is difficult to remove from skin or clothing. By contrast, external electrodialysis of permeate takes place outside of the paint bath enclosure and the permeate, which is substantially water and trace amounts of solvents and solubilizer, is significantly more pleasant to work with than the paint itself. External cells are also accessible while the paint line is in operation, so that maintenance can be performed at the convenience of the user.

2. Direct, or in situ, electrodialysis is accomplished by the same power source that causes the deposition of the paint and is therefore generally in proportion to the painting rate. At first glance, this would appear to be advantageous; however, it has disadvantages. First, the direct process naturally removes more solubilizer than is required to maintain the bath chemistry. It is therefore necessary to add solubilizer back to the system. The user must therefore purchase and handle this solubilizer and pay for the waste treatment on the excess solubilizer that is removed from the system. On the other hand, it is not unusual for the cells to leak of overflow. This creates an excess of solubilizer in the paint bath which can only be removed as part of the painting process. This means that returning the paint bath to the desired composition after such an excursion may take many days or even weeks. For these reasons, it is often difficult to control precisely the paint bath chemistry with situ or direct electrodialysis. By contrast, since external electrodialysis operates independently of the painting process, more precise control of paint bath chemistry is possible and it is possible to recover from major excursions even during non-production periods.

3. Some electrocoating operations with very low or intermittent production have difficulty removing enough solubilizer by in situ electrodialysis because solubilizer removal is only taking place concurrently with painting. However, since the ultrafilter operates continuously and independent of the painting process, and the permeate is therefore available continuously, with external electrodialysis it is possible to remove as much or as little solubilizer as needed at any given time to maintain paint bath chemistry.

4. Some other electrocoating operations have a very high ware area in comparison to the size of the paint bath (for example, the painting of heat exchangers) and it is physically difficult to place enough electrodialysis cells in the paint bath to accomplish the desired solubilizer removal. Again by contrast, these applications can be easily satisfied by external electrodialysis.

In spite of these obvious advantages and numerous commercial attempts, electrodialysis of the permeate has not been commercially successful, primarily for two reasons. First, with in situ electrodialysis, the ware itself functions as the object electrode. For permeate electrodialysis, a separate, sacrificial object electrode must be provided to serve as the opposing electrode in the cell. Even though the ultrafilter permeate is substantially water, it also contains some paint pigment and low molecular weight resin. This pigment and resin tend to become coated on the sacrificial object electrode and accumulates over time. Eventually this coating increases the electrical resistance of the cell and the object electrode must be cleaned or replaced.

Second, the electrodialysis cells that have been applied to ultrafilter permeate have been of the so-called plate and frame design, or variations thereof, in which the cell consists of alternating flat plate object and counter electrodes with ion exchange membranes and flow channel spacers sandwiched in between as shown in FIG. 1 for plate and frame cell 10. Electrolyte 12 and permeate 14 are circulated in directions indicated by arrows through the respective spacer channels defined by anodes 16 and 18, cathode 20 and ion exchange membranes 22 and 24. Solubilizer ions 26 and 28 pass through respective membranes 22 and 24 while paint particles 30 and 32 attach to cathode 20. This classic cell design has the advantage of minimizing the voltage required to operate the cell. However, it has the disadvantage of being difficult to disassemble for servicing in the event of cathode fouling as described above, or anode dissolution, membrane leaks, etc. In the case of electrodialysis of electrocoat paint ultrafilter permeate, both object electrode fouling and anode dissolution are common. Accordingly, the plate and frame design for electrodialysis cells is not commercially attractive.

SUMMARY OF THE INVENTION

The present invention has equipment design and process aspects that solve the above-described problems associated with the electrodialysis of electrocoat paint ultrafilter permeate. An electrodialysis cell embodying the present invention comprises concentric cylinders: a substantially cylindrical counter electrode inside a slightly larger tubular ion exchange membrane, which is in turn inside a larger, substantially cylindrical hollow object electrode, which is in turn inside a slightly larger non-conductive housing. Electrolyte is passed through the annular space between the counter electrode and the ion exchange membrane, and ultrafilter permeate is injected at the bottom of the housing and flows upwardly through the annular space between the ion exchange membrane and the object electrode. Optionally, the electrolye and permeate can be recirculated through the electrodialysis cell.

This arrangement has two advantages over the above-described plate and frame design. First, while still minimizing the spacing between the opposing electrodes, so that operating voltage is minimized, the configuration of the present invention is relatively easy to disassemble for inspection or service. The counter electrode, the tubular membrane, and the hollow object electrode can all be removed easily by hand without the use of tools. Also there are no mechanical seals or gaskets. Second, the concentric tube arrangement means that the object electrode-to-counter electrode surface area ratio is greater than one-to-one, in contrast to the plate and frame design where the ratio necessarily is one-to-one. Since coating of the object electrode with paint pigment and resin is typically the limiting factor in the operation of the system, the relatively greater object electrode area means that the time between object electrode cleanings or replacements is increased.

A further improvement is to utilize a tubular object electrode made of a reticulated material, which further increases the effective object electrode-to-counter electrode area ratio. In this manner object electrode-to-counter electrode area ratios of at least 6, i.e., 6-to-1 or more, can be readily achieved. As a result, the current flux at the object electrode becomes so low that substantially no resin or pigment is deposited at the object electrode.

Another second improvement is achieved by manifolding several similar cell modules in parallel so that the treated ultrafilter permeate exits each cell and enters a common chamber ("pan") wherein any precipitate present is allowed to float to the surface where it can be easily removed.

A third improvement is achieved by selecting the proper process operating envelope. In spite of the advantages of the above design, paint resin and pigment may still precipitate if too much solubilizer is extracted from the permeate. This precipitate does not typically adhere to the object electrode, but it can still cause fouling in piping downstream from the cell, and it is undesirable in the paint bath or ware rinsing circuits. This problem can be avoided by optimizing the amount of solubilizer removed from the permeate by modulating the ratio of current-time integral for the production rectifier to the current-time integral for the electrodialysis rectifier. The solubilizer can be acidic or basic, depending upon whether the process is cathodic or anodic.

A fourth improvement is achieved by selecting an ultrafiltration membrane that appropriately limits the amount of solids in the ultrafilter permeate so as to minimize the amount of solids precipitated.

A fifth improvement is a method for controlling electrolyte conductivity by the addition of water to the electrolyte cells so as to maintain proper electrolyte composition and flow without the use of an electrolyte pumping circuit. A preferred electrolyte conductivity is in the range of about 1,000 to about 5,000 microSiemens (μS).

A sixth improvement is achieved by recirculating at least a portion of the treated permeate through the cell for a predetermined time period at a rate so as to increase the velocity in the annular space between the membrane and the object electrode. This serves to enhance mass transfer of the solubilizer through the membrane and further reduce deposition of paint solids at the object electrode. The permeate recirculation rate is selected so as to provide an increase in permeate flow velocity through the cell over that obtained by permeate withdrawal and return of a portion of the treated permeate to the electrocoat paint bath.

DESCRIPTION OF PREFERRED EMBODIMENTS OF THE INVENTION

Specifically, the electrical resistance of the cell and the minimization of solids precipitation at the object electrode determine certain area ratios between the system elements for optimum performance. A workable and commercially practicable design has been developed in which the object electrode-to-counter electrode area ratio is at least about 6, and preferably about 6 to about 7. A particularly preferred counter electrode has an outside diameter of about 1.9 inches, the ion exchange membrane has an inside diameter of about 2.9 inches and the object electrode has an outside diameter of about 4 inches. Moreover, a preferred object electrode is made of a reticulated material so that its actual surface is approximately 3.2 times its apparent cross sectional area. With this combination of dimensions, the ratio of object electrode area ($A_o$) area to counter electrode area ($A_c$) is equal to about 6.7. Previous research has shown that preferred counter electrode current density is no more than about 5 amperes per square foot for commercially acceptable counter electrode life. The use of a object electrode-to-counter electrode area ratio of about 6.7 or more insures that the object electrode current density will be less than about 0.75 amperes per square foot. At object electrode current densities greater than 0.75 amperes per square foot, undesirable precipitation at the object electrode is greatly increased. The foregoing arrangement also provides a object electrode-to-membrane area ratio of more than about 4, e.g., about 4.4, which results in a maximum membrane current density of about 3.3 amperes per square foot or less (at the peak counter electrode current density of 5 amps per square foot). This membrane current density results in a membrane electrical resistance that accommodates commercially viable system operating voltages.

Figure 1:
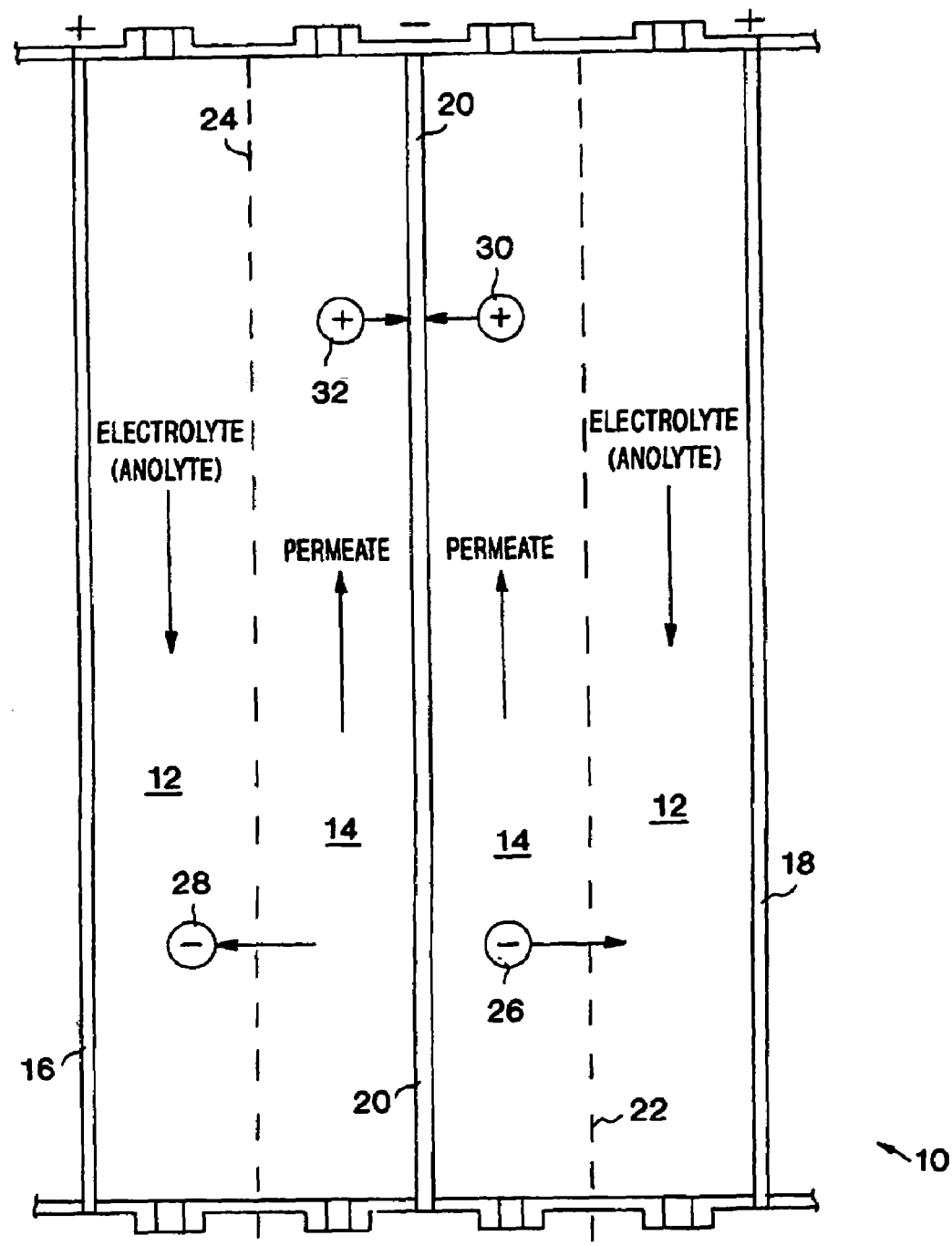
FIG. 1 illustrates a conventional plate-and-frame dialysis cell.
Figure 2:
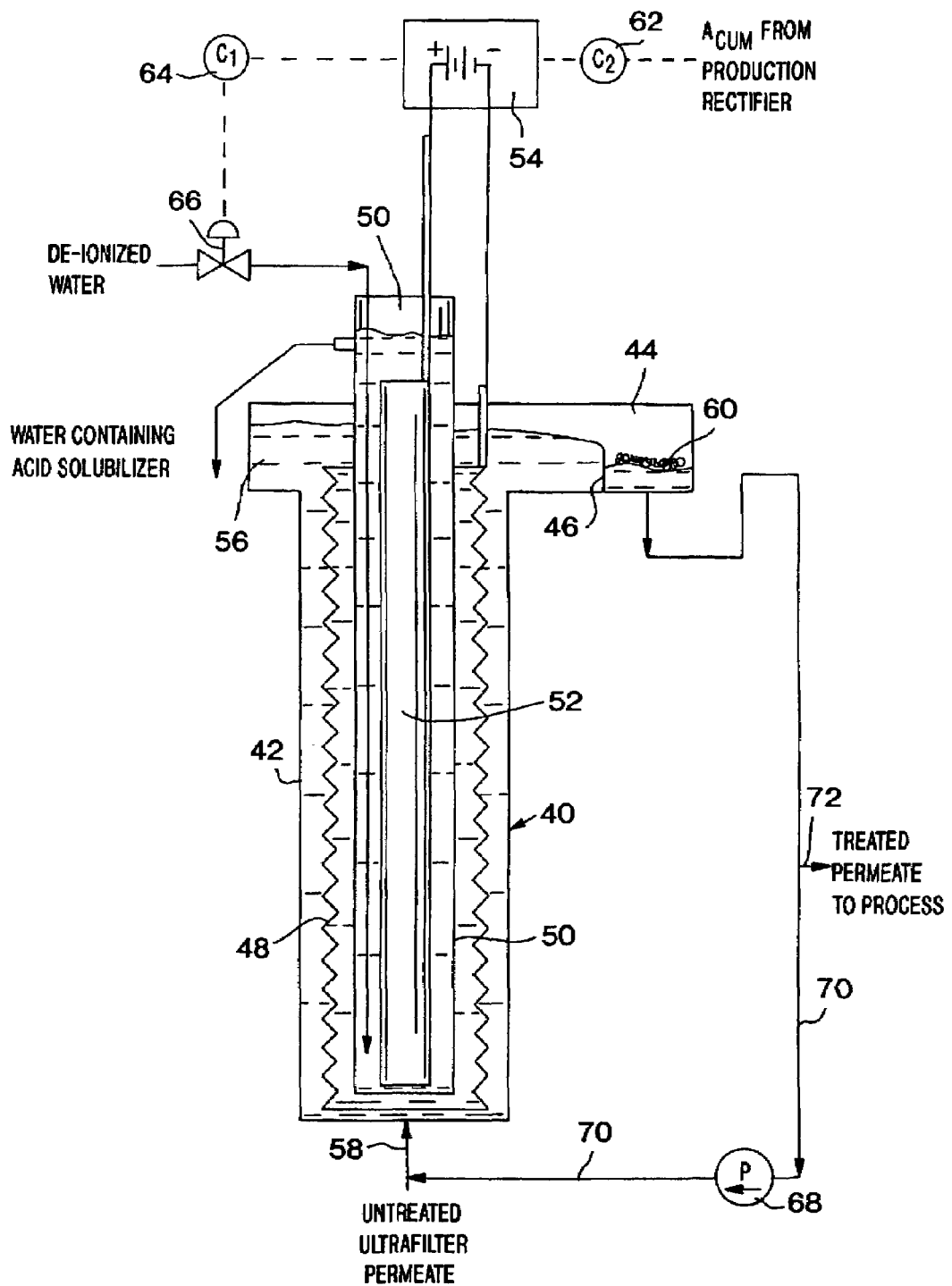
FIG. 2 illustrates a dialysis cell embodying the present invention in a cathodic system.
Figure 3:
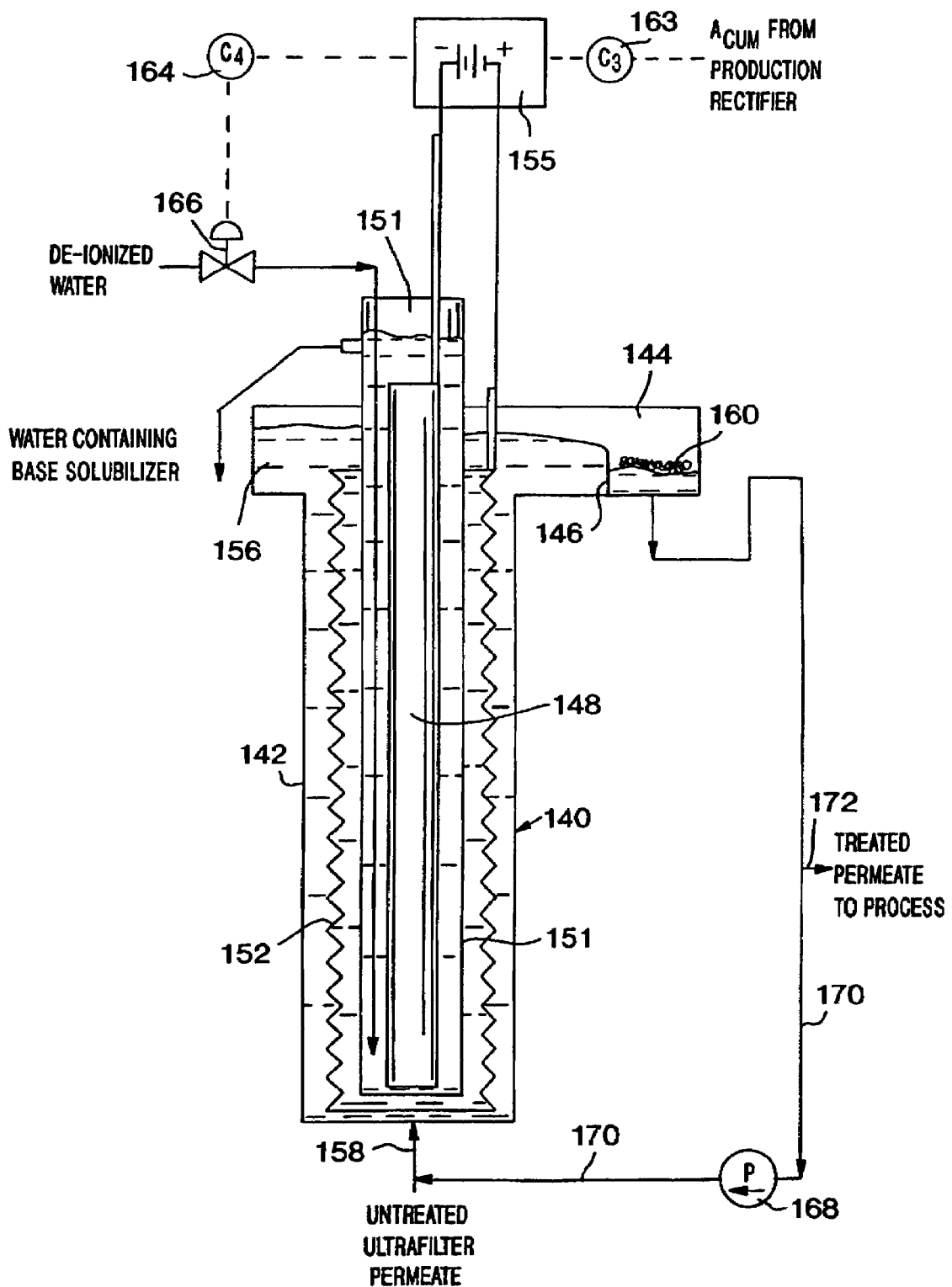
FIG. 3 illustrates a dialysis cell embodying the present invention in an anodic system.

Even with the above ratios effected, there may be some precipitate formed. This precipitate tends to float and accumulate at the top of the cell housing at the treated permeate overflow level. This problem is solved by means of a chamber in the form of a "pan" or "tray." One or more individual cells of the same general type can be connected in parallel to a common chamber which includes an overflow weir. The height of the object electrode tube is established so that the top of the object electrode tube will be below the liquid level dictated by the weir, i.e., the maintained liquid level is above the object electrode. This arrangement prevents the floating precipitate from adhering to the object electrode, which would otherwise eventually block the annular space between the membrane tube and the cell housing. The treated permeate overflows into a separate chamber and out of a port in the bottom of said chamber. The pipe exiting the overflow chamber is routed as shown in FIGS. 2 and 3 so as to maintain a liquid level in the overflow portion of the chamber. This arrangement allows any floating resin precipitate to be removed easily from the chamber manually while preventing it from being carried out of the system to the rinses where it would contaminate the rinse water.

Even with the foregoing equipment features, paint resin and pigment may precipitate under certain conditions. In general, it has been found that precipitation increases substantially if more than half of the solubilizer is removed from the permeate. That is, a certain solubilizer concentration is to be maintained in the permeate. It is now clear that many first generation systems failed at least partly because too high of a percentage of the solubilizer was removed from the permeate. Because the permeate is buffered to a degree, and some of the solubilizer is not dissociated from the paint resin and pigment, the total solubilizer content of the permeate is difficult to monitor by pH measurements alone. Rather, it is more convenient to titrate the permeate to determine the true solubilizer content as a function of pH for a given paint system, and adjust the rate of solubilizer removal by adjusting the current-time integral ratio of the production rectifier to the electrodialysis rectifier. Additionally, there are many different paint formulations, so these data are obtained for each paint individually. In all paint systems studied to date, the precipitation of paint resin and pigment is substantially reduced in general if the solubilizer removal is no more than one half, i.e., is less than or equal to 50%. For a given paint type and permeate flow rate, this removal level corresponds to an optimized electrodialysis rectifier amperage for solubilizer removal without excessive precipitation.

Another criterion for limiting solids precipitation from the permeate has been found to be the solids content of the ultrafilter permeate. The solids content varies greatly depending upon the ultrafiltration membrane utilized and the method of operation of the ultrafiltration system. There are many different ultrafiltration membranes used in electrocoat painting; the membranes vary both in surface chemistry and nominal molecular weight cutoff. The performance of the membrane also varies depending on the operating pressures of the ultrafiltration system. It has been found that when permeate solids levels exceed about 0.5 weight percent, the higher solids level also corresponds to higher molecular weight solids, since the membrane typically has a higher molecular weight cutoff. These higher molecular weight solids are the most likely solids to be precipitated as solubilizer is removed from the permeate. It has therefore been found that selecting an ultrafiltration membrane and operating it so that permeate solids levels are no more than about 0.5 weight percent results in significantly less solids precipitation in the electrodialysis process.

In conventional in situ electrolyte systems and external electrodialysis cells, electrolyte is circulated through the counter electrode side of the cell with a pump. While this arrangement is practical, the pump is a separate item of rotating equipment that must be maintained, etc. In the present system, we have discovered that the amount of solubilizer that is extracted into the electrolyte from the ultrafilter permeate is generally proportional to the electrical current of the cell integrated through time. This fact makes possible an alternative means of displacing solubilizer from the electrolyte side of the cell; water can be injected into the cell in proportion to the current-time integral (e.g., amperes•hours) from the cell rectifier. In practice, this is best accomplished by injecting water via a proportioning valve that opens after a set increment of current•time has been accumulated. In practice, it is best if the amount of water injected at any one time displaces approximately 25 to 50 volume percent of the water in the electrolyte chamber of the cells at a flow rate equivalent to approximately 0.5 gallons per minute per cell. For example, in a system with eight cells in parallel, each of which has an electrolyte volume of about 1.3 gallons, the total electrolyte volume is about 10.4 gallons. In this case, about 2.6 to 5.2 gallons of water are injected at a rate of 4 gallons per minute (gpm). The appropriate injection time would therefore be 0.65 to 1.3 minutes to displace to 25 to 50% of the electrolyte. Alternatively, each cell can be injected in sequence with a distributor valve. The electrolyte conductivity is maintained in the range of about 1000 to about 5000 mnicroSiemens.

The above-described system can still be adjusted manually on a periodic basis. Normally, an operator periodically measures the pH or acid solubilizer concentration of the paint bath and adjusts the electrodialysis cell voltage and current accordingly. For example, if the solubilizer concentration in the bath were increasing, or the pH were decreasing, the operator increases the electrodialysis system voltage to increase the current flow and thereby increase the rate of solubilizer removal. While this is workable, it is inconvenient. It has been found that the amount of free solubilizer to be removed from the system is generally proportional to the current-time integral for the paint production rectifier. Since the amount of solubilizer removed by the electrodialysis cell is generally proportional to the current-time integral for the electrodialysis rectifier, the two integrals are proportional to each other.

While these proportional relationships vary from paint to paint and system to system, each combination of paint and system design has been found to have a substantially constant ratio between the production and electrodialysis cell current-time integral in the range of about 2:1 to about 5:1, usually about 3:1 to about 4:1. It is thus practical to control the electrodialysis rectifier by a proportional control signal from the production rectifier. The proportional control needed is estimated for each system based on experience, and then confirmed and refined by trial and error. However, it is important that the maximum electrodialysis amperage noted previously not be exceeded. The electrodialysis cell amperage determined by the proportioning factor from the production rectifier must therefore be limited so that it does not exceed this maximum. For example, a paint line that is operating continuously at 100 amperes might require 30 amperes of electrodialysis cell amperage according to the proportional relationship. However, it may have been determined that the maximum practical electrodialysis amperage for the permeate flow and solubilizer concentration is 20 amperes. The control system thus operates the electrodialysis cell at 20 amperes, but continues to operate after the paint line is shut down for the night or weekend until such time as the current-time integral for the electrodialysis system had accumulated about 30% of the value of the production current-time integral.

Even with all of the above conditions effected, some combinations of operating conditions and permeate flows lead to inadequate mixing in the annular permeate channel between the ion-exchange membrane and the object electrode. It has been found that increasing this flow rate in these cases improves mixing of the permeate and mass transfer of solubilizer from the permeate across the ion-exchange membrane. The increased flow also further reduces the rate of paint solids deposition at the object electrode. This increase in flow can be accomplished by recirculating at least a portion of the treated permeate overflow back to the permeate inlet of the cell.

FIG. 2 shows schematically an ultrafilter permeate cathodic paint electrodialysis system embodying the present invention. Cell 40, which can be one in a series of parallel cells, is constituted by a hollow electrolyte housing 42 which terminates at the upper end thereof in a pan 44 equipped with weir 46. A hollow, reticulated cathode tube 48 which serves as the object electrode is received within housing 42 together with anion exchange membrane tube 50 and anode tube 52 (the counter electrode). Cathode tube 48, membrane tube 50 and anode tube 52 are substantially concentric with one another. The electrodialysis rectifier 54 and its proportioning controller 62 are operably connected between cathode tube 48 and anode tube 52. Proportioning controller 64 is operably connected between rectifier 54 and solenoid or proportioning valve 66 for regulating the flow of deionized water into cell 40.

Ultrafilter permeate 56 is introduced into housing 42 at a bottom inlet via line 58 and treated permeate is withdrawn for return to a paint solution bath (not shown) via line 72. A portion of the treated permeate can be recycled to cell 40 via line 70 and associated pump 68. Precipitated resin is removed at 60.

FIG. 3 shows schematically an ultrafilter permeate anodic paint electrodialysis system that embodies the present invention. Cell 140, which can be on in a series of parallel cells, is constituted by a hollow electrolyte housing 142 which terminates at the upper end thereof in pan 144 provided with weir 146. A hollow, reticulated anode tube 152 which serves as the object electrode is received within housing 142 together with cation exchange membrane tube 151 and cathode tube 148 (the counter electrode). Anode tube 152, cation exchange membrane tube 151 and cathode tube 148 are substantially concentric with one another. Electrodialysis rectifier 155 and its proportioning controller 163 are operably connected between anode tube 152 and cathode tube 148. Proportioning controller 164 is operable connected between rectifier 155 and solenoid or proportioning valve 166 for regulating the flow of deionized water into cell 140.

Ultrafilter permeate 156 is introduced into housing 142 at a bottom inlet via line 158, and treated permeate is withdrawn for return to a paint solution bath (not shown) via line 172. A portion of the treated permeate can be recycled, or recirculated, to cell 140 via line 170 and associated pump 168. Precipitated resin is removed at 160.

The foregoing description and drawings are illustrative but not limiting. Still other variations within the scope and spirit of the present invention are possible.

We claim:

1. An electrodialysis cell suitable for removal of paint solubilizer from electrocoat paint ultrafilter permeate and comprising:
   a tubular, non-conductive housing;
   a substantially cylindrical, hollow, reticulated object electrode in the housing;
   a substantially cylindrical counter electrode situated within the hollow object electrode and substantially concentric therewith; and
   a tubular ion exchange membrane surrounding the counter electrode and positioned between the counter electrode and the object electrode but spaced therefrom;
   the counter electrode and the membrane together defining an annular circulating electrolyte passageway, the object electrode and the membrane together defining an annular circulating ultrafilter permeate passageway, and the object electrode-to-counter electrode area ratio being at least about 6 and said cell, said electrodialysis cell including a permeate overflow chamber shared with other similar electrodialysis cells and a weir in the overflow chamber for maintaining a substantially constant permeate level in the overflow chamber, the maintained permeate level being above the hollow object electrode.

2. The electrodialysis cell in accordance with claim 1 wherein the object electrode-to-counter electrode area ratio is about 6.7.

3. The electrodialysis cell in accordance with claim 1 wherein the object electrode-to-membrane ratio is more than about 4.

4. The electrodialysis cell in accordance with claim 3 wherein the object electrode-to-membrane ratio is about 4.4.

5. The electrodialysis cell in accordance with claim 1 wherein the object electrode is a cathode and the counter electrode is an anode.

6. The electrodialysis cell in accordance with claim 1 wherein the object electrode is an anode and the counter electrode is a cathode.

* * * * *